Aug. 21, 1951 R. J. GRAY 2,564,686
VALVE
Filed Oct. 31, 1945
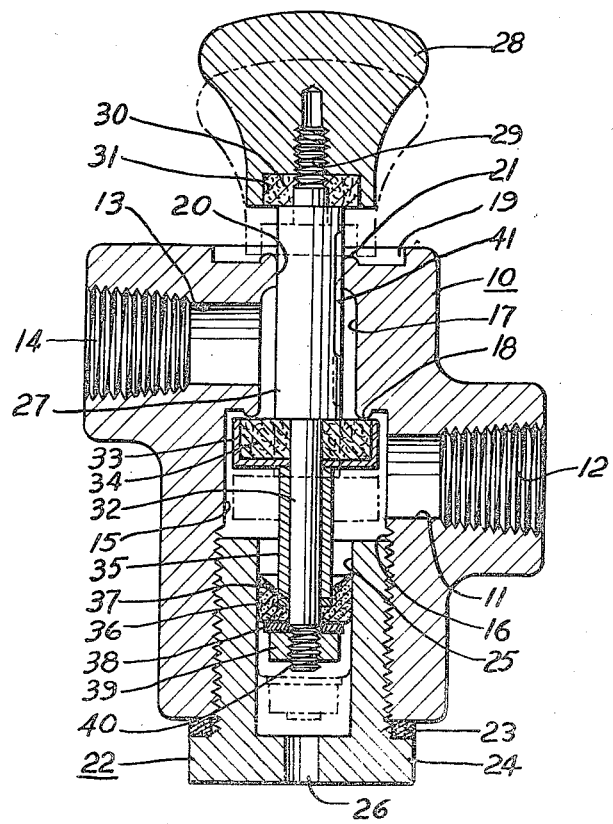
INVENTOR.
RUSSELL J. GRAY
BY
Leonard F. Kalish Patented Aug. 21, 1951

2,564,686

UNITED STATES PATENT OFFICE 2,564,686

VALVE

Russell J. Gray, Excelsior, Minn., assignor, by mesne assignments, to Gray Company, Inc., Minneapolis, Minn., a corporation of Minnesota Application October 31, 1945, Serial No. 625,811

5 Claims. (Cl. 251—135)

The present invention relates to valves for fluid lines and it relates more particularly to a new and improved valve capable of use under high fluid pressures and having a quick, easy and gentle opening and closing action; and adapted to be maintained in either open or closed position by fluid pressure.

An object of the present invention is to provide a new and improved valve construction. Another object of the present invention is to provide a valve capable of use under high fluid pressures, and having a quick, easy and gentle opening and closing action, and capable of being maintained in either closed or opened position by fluid pressure. Still another object of the present invention is to provide a valve for high pressure fluid lines which is very fast and positive in on-off action and which is capable of relieving fluid pressure within the fluid line when moved to closed position.

Other objects and advantages of the present invention are apparent in the following detailed description, appended claims and accompanying drawings.

The present invention contemplates the provision of a new and improved valve construction wherein the fluid pressure is caused, in part, to balance itself so as to permit quick, easy, positive and gentle opening and closing action of the valve. The present invention further contemplates a balanced valve construction for fluid lines or the like which is adapted to be urged by fluid pressure to either closed or opened position, whichever is pre-selected manually.

For the purpose of illustrating the invention, there is shown in the accompanying drawing one form thereof which is at present preferred, although it is to be understood that the various instrumentalities of which the invention consists can be variously arranged and organized and that the invention is not limited to the precise arrangements and organizations of the instrumentalities as herein shown and described.

The accompanying drawing represents a cross-sectional view of one embodiment of the present invention.

In one embodiment of the present invention shown in the drawing, I may provide a valve body 10 which may be of steel or other suitable material die-cast or otherwise suitably formed.

The body 10 is provided with an inlet conduit 11 having a screw-threaded socket 12 adapted for detachable connection to an inlet pipe-line or the like (not shown) and an outlet conduit 13 having a screw-threaded socket 14 adapted for detachable connection to an outlet pipe-line or the like (not shown)—the conduits 11 and 13 having their axes generally horizontal but somewhat vertically displaced.

A generally cylindrical opening 15 extends vertically upward from the bottom of the body 10—the lower portion of the opening 15 being internally screw-threaded as at 16. The inlet conduit 11 communicates with the upper end of the opening 15 while the outlet conduit 13 communicates with a chamber 17 extending vertically upward from the upper end of the opening 15—the chamber 17 being generally co-axial with the opening 15 but having a smaller diameter than said opening 15.

A downwardly protruding annular rib 18 surrounds the lower end of the chamber 17 and provides a valve-seat whose function will be hereinafter described.

A shallow recess 19 is provided in the upper wall of the body 10—a reduced opening 20 connecting the recess 19 with the upper end of the chamber 17. The opening 20 is generally co-axial with the chamber 17 and the opening 15 and is provided, at its upper end, with an annular upwardly protruding rib 21 which provides another valve-seat, whose function will be hereinafter described.

An externally screw-threaded plug 22 is removably connected within the screw-threaded portion 16 of the opening 15—an annular gasket 23 intermediate the lowermost shoulder 24 of said plug 22 and the bottom wall of the body 10 providing a fluid-tight seal therebetween.

A generally cylindrical bore 25 extends downwardly from the upper end of the plug 22 to a point somewhat above the lower end of said plug—a reduced vent opening 26 extending from the lower end of the bore 25 to the outside of the plug 22.

An elongated generally cylindrical plunger 27 is slidably mounted within the opening 20—an operating handle 28 being screw-threadedly mounted upon a reduced upper extension 29 thereof.

An annular compressible sealing gasket 30 is adapted to be retained within a stuffing-box 31 formed in the lower end of the handle 28—the gasket 30 being adapted to make fluid-tight sealing contact with the valve-seat 21 when the handle 28 is in its lowermost position as shown in dash-dot lines in Figure 1.

An elongated reduced stem 32 extends downwardly from the lower end of the plunger 27 and into the bore 25 of the plug 22.

A centrally-apertured stuffing-box 33 is adapted to be mounted upon the stem 32—an annular compressible sealing gasket 34 being adapted to be retained therewithin and to make fluid-tight sealing contact with the valve-seat 18 when the plunger 27 is in its uppermost position as shown in solid lines in Figure 1.

The stuffing-box 33 is maintained in position at the upper end of the stem 32 by an elongated sleeve 35 fitting about the lower portion of said stem 32 and bearing against the bottom of stuffing-box 33.

An apertured cup-washer 36 of leather or the like is mounted upon the stem 32 below the sleeve 35—metal washers 37 and 38 being disposed above and below the cup-washer 36 respectively.

A nut 39 is mounted upon the lowermost screw-threaded end 40 of the stem 32 and serves to hold the cup-washer 36, the sleeve 35 and stuffing-box 31 in position upon the stem 32.

The cup-washer 36 provides a fluid-tight sliding seal with the bore 25.

A groove 41 extends generally axially along the outer surface of the plunger 27—the upper end of the groove 41 being outside the body 10 when the plunger 27 is in uppermost position as shown in solid lines in Figure 1 (whereby the groove 41 serves as a vent for the chamber 17) and being below the upper end of the opening 20 when the plunger 27 is in lowermost position as shown in dash-dot lines in Figure 1. The operation of the embodiment of Figure 1 will now be described.

Assuming the valve to be in the closed position shown in solid lines in Figure 1, when fluid under pressure (which may be either a liquid or a gas, such as compressed air) is passed through the inlet conduit 11 and into the upper end of the opening 15, it exerts an upward pressure upon the stuffing-box 33 and a downward pressure upon the cup-washer 36—the extent of the upward pressure being determined generally by the diameter of the rib or valve-seat 18 while the extent of the downward pressure is determined generally by the diameter of the bore 25.

Since the diameter of the rib or valve-seat 18 is greater than the diameter of the bore 25, it follows that the upward pressure will be greater than the downward pressure so that the valve will be maintained in closed position with the gasket 34 pressed in fluid-tight sealing relationship against the rib or valve-seat 18.

Thus, the fluid pressure serves automatically to maintain the valve in closed position so that no fluid can pass to the chamber 17 and the outlet conduit 13.

Since differential upward pressure upon the plunger 27 is relatively small (due to the relatively small difference in diameters of the valve-seat 18 and the bore 25), the plunger can readily be pushed inward and downward by manual pressure exerted upon the handle 28.

When the handle 28 and plunger 27 are moved to their downward position as shown in dash-dot lines in Figure 1, the gasket 34 is unseated from the rib or valve-seat 18 whereupon fluid is permitted to pass upward into the chamber 17 and out through the outlet conduit 13.

With the plunger 27 in its lowermost position, as shown in dash-dot lines in Figure 1, the stuffing-box is no longer operative to transmit axial pressure in either direction axially of the plunger 27 since the pressures on the top and bottom of the stuffing-box counteract each other. Thus, in its lowermost position, the plunger 27 is urged downwardly by the pressure upon the top of the cup-washer 36 and is urged upwardly by the pressure upon the gasket 23. Since the upper pressure on the sealing gasket 30 is determined by the diameter of the rib or valve-seat 21, and since this diameter is less than the diameter of the bore 25, it follows that there will be a differential downward pressure upon the plunger 27 such as will maintain it in its lowermost position wherein the valve is open and fluid is permitted to pass from the inlet conduit through the opening 15 and the chamber 17, and out through the outlet conduit 13.

Thus, once the valve has been manually moved to open position, the fluid pressure will maintain it in open position.

When it is desired to close the valve, the handle 28 is simply manually pulled up to its uppermost position wherein the stuffing-box 33 contacts the rib 18 whereupon the differential upward pressure exerted by the fluid will maintain the valve in closed position as previously described.

With the valve thus manually moved back to closed position, the groove 41 serves to vent the chamber 17, the outlet conduit 13 and the delivery pipe-line so that the fluid pressure in the delivery pipe-line drops to atmospheric pressure.

Where it is not desired to vent the outlet pipe-line upon closing of the valve, the groove 41 is simply omitted from the plunger 27 whereupon manual closing of the valve will simply cut off further flow of fluid to the outlet pipe-line while preserving the pressure within.

In place of the cup-washer 36, any other type of movable fluid-tight seal may be provided at the lower end of the stem 32—as for example, a flexible diaphragm mounted on said stem and peripherally connected in fluid-tight sealing relationship with the wall of the opening 25.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described my invention, what I claim as new and desire to protect by Letters Patent is:

1. A valve for controlling the flow of fluid comprising a housing having a chamber therein, an annular valve seat disposed generally at one end of said chamber, an outlet conduit communicating with the opposite side of said valve seat, a movable main valve member adapted to contact said valve seat so as to close said valve and to cut off said outlet conduit, a stem extending from said main valve member, a movable sealing element carried by said stem and adapted to seal off a reduced diametered portion of said chamber generally adjacent the other end thereof, an inlet conduit communicating with said chamber for introducing fluid under pressure into said chamber, the main valve member having greater effective surface exposed to the fluid pressure than the movable sealing element, the fluid pressure exerted against the main valve member tending to maintain it in closed position, the fluid pressure against said movable sealing element partially but not entirely counteracting the closing pressure upon said main valve member, a plunger extending from said main valve member outside said housing, a secondary valve member carried by said plunger on the outlet side of the main valve member exteriorly of said housing; an annular valve seat for said secondary valve member exteriorly of said housing, said plunger being adapted to be moved inward to unseat the main valve member and to seat the secondary valve member, the secondary valve member being acted upon by fluid pressure in a direction opposite to the action on the movable sealing element only when said main valve is open and having smaller effective surface exposed to the fluid pressure than the movable sealing element whereby it partially but not entirely counteracts the main-valve-opening pressure upon said movable sealing element, the valve-closing pressure of the main valve member being eliminated when said main valve member is unseated, the main valve element being maintained in unseated position by fluid pressure when said plunger is moved inward thereby permitting flow of fluid from said inlet conduit through said chamber and the main valve to said outlet conduit and being maintained in seated position by fluid pressure when said plunger is moved outward.

2. A valve for controlling the flow of fluid comprising a housing having a chamber therein, an annular valve seat disposed generally at one end of said chamber, an outlet conduit communicating with the opposite side of said valve seat, a movable main valve member adapted to contact said valve seat so as to close said valve and to cut off said outlet conduit, a stem extending from said main valve member, a piston carried by said stem and adapted to seal off a reduced diametered bore communicating with said chamber generally adjacent the other end thereof, an inlet conduit communicating with said chamber for introducing fluid under pressure into said chamber, the main valve member having greater effective surface exposed to the fluid pressure than the piston, the fluid pressure exerted against the main valve member tending to maintain it in closed position, the fluid pressure against said piston partially but not entirely counteracting the closing pressure upon said valve member, a plunger extending from said main valve member outside said housing, a secondary valve member carried by said plunger on the outlet side of the main valve member exteriorly of said housing, an annular valve seat for said secondary valve member exteriorly of said housing, said plunger being adapted to be moved inward to unseat the main valve member and to seat the secondary valve member being acted upon by fluid pressure in a direction opposite to the action on the piston only when said main valve is open and the secondary valve member having smaller effective surface exposed to the fluid pressure than the piston whereby it partially but not entirely counteracts the main-valve-opening pressure upon said piston, the valve-closing pressure of the main valve member being eliminated when said main valve member is unseated, the main valve element being maintained in unseated position by fluid pressure upon said piston when said plunger is moved inward thereby permitting flow of fluid from said inlet conduit through said chamber and the main valve to said outlet conduit and being maintained in seated position by fluid pressure upon said main valve member when said plunger is moved outward.

3. A valve for controlling the flow of fluid and adapted selectively to be maintained in either closed or open position by fluid pressure, said valve comprising a housing having a chamber therein, an annular valve seat disposed generally at one end of said chamber, an inlet conduit communicating with said chamber at a point generally intermediate the ends of said chamber, an outlet conduit extending from the other side of said valve seat, a reduced bore extending from the other end of said chamber and generally coaxial therewith, said bore having a diameter somewhat less than that of said valve seat, a secondary oppositely-facing annular valve seat disposed on the outlet side of the main valve seat exteriorly of said housing, said secondary valve seat having a diameter somewhat smaller than that of said reduced bore, a movable valve assembly slidably mounted within said housing, said valve assembly including a main valve member disposed within said chamber and adapted to make sealing contact with the main valve seat, a stem extending from said main valve member and into said reduced bore, a piston carried by said stem and adapted to make fluid-tight sliding contact with said reduced bore, a plunger extending from the outlet side of said main valve member and protruding from said housing, a secondary valve member carried by said plunger exteriorly of said housing and adapted to contact said secondary valve seat, and a handle carried by the protruding end of said plunger, the main valve member being moved into contact with the main valve seat and the secondary valve member being moved out of contact with the secondary valve seat when the handle is moved to its outermost position whereby the valve-closing fluid pressure exerted upon the main valve member is partially but not entirely counteracted by the pressure on said piston, the main valve member being moved out of contact with the main valve seat and the secondary valve member being moved into contact with the secondary valve seat when the handle is moved to its innermost position whereby the fluid pressure exerted upon the piston and tending to maintain the main valve member in open position is partially but not entirely counteracted by the pressure on the secondary valve member only when said main valve is open.

4. A valve for controlling the flow of fluid and adapted selectively to be maintained in either closed or open position by fluid pressure, said valve comprising a housing having a chamber therein, an annular valve seat disposed generally at one end of said chamber, an inlet conduit communicating with said chamber at a point generally intermediate the ends of said chamber, an outlet conduit extending from the other side of said valve seat, a reduced bore extending from the other end of said chamber and generally coaxial therewith, said bore having a diameter somewhat less than that of said valve seat, a secondary oppositely-facing annular valve seat disposed on the outlet side of the main valve seat exteriorly of said housing, said secondary valve seat having a diameter somewhat smaller than that of said reduced bore, a movable valve assembly slidably mounted within said housing, said valve assembly including a main valve member disposed within said chamber and adapted to make sealing contact with the main valve seat, a stem extending from said main valve member and into said reduced bore, a piston carried by said stem and adapted to make fluid-tight sliding contact with said reduced bore, a plunger extending from the outlet side of said main valve member and protruding from said housing, a secondary valve member carried by said plunger exteriorly of said housing and adapted to contact said secondary valve seat, and a handle carried by the protruding end of said plunger, the main valve member being moved into contact with the main valve seat and the secondary valve member being moved out of contact with the secondary valve seat when the handle is moved to its outermost position whereby the valve-closing fluid pressure exerted upon the main valve member is partially but not entirely counteracted by the pressure on said piston, the main valve member being moved out of contact with the main valve seat and the secondary valve member being moved into contact with the secondary valve seat when the handle is moved to its innermost position whereby the fluid pressure exerted upon the piston and tending to maintain the main valve member in open position is partially but not entirely counteracted by the pressure on the secondary valve member only when said main valve is open, said plunger being provided with vent means operable when said handle is pulled outward to vent the outlet side of said main valve member.

5. A partially balanced valve for controlling the flow of a fluid comprising a housing having a chamber therein, an inlet conduit communicating with said chamber, an annular valve seat disposed within said housing and communicating with said chamber, an outlet conduit communicating with the opposite side of said valve seat, a movable valve assembly having a valve element disposed within said chamber and adapted to contact said valve seat to close said valve and adapted normally to be retained in closed position by the pressure of fluid thereon, said valve assembly also having a movable pressure-responsive element disposed on the inlet side of said valve seat and adapted to be urged by fluid pressure in a direction opposite to said valve element, the effective pressure-exposed surface of said pressure-responsive element being less than that of said valve element whereby the pressure on the closed valve element is partially but not entirely counteracted, said valve assembly also having a second movable pressure-responsive element disposed on the outlet side of said valve seat exteriorly of said housing and adapted to be urged by fluid pressure in a direction opposite to that of said first-mentioned pressure-responsive element, the effective pressure-exposed surface of said second-mentioned pressure-responsive element being less than that of said first-mentioned pressure-responsive element, and means for selectively positioning said valve assembly in either closed or open position, said valve assembly being retained in open position by fluid-pressure exerted on said first-mentioned pressure-responsive element which is partially but not entirely counteracted by the fluid-pressure exerted on said second-mentioned pressure-responsive element only when said valve is open.

RUSSELL J. GRAY.

REFERENCES CITED

The following references are of record in the file of this patent:

UNITED STATES PATENTS

| Number | Name | Date |
|---|---|---|
| 639,673 | Dyblie | Dec. 19, 1899 |
| 907,686 | Doffie | Dec. 22, 1908 |
| 1,623,557 | Rybeck | Apr. 5, 1927 |